May 13, 1958 L. W. PETERSEN 2,834,409
EVAPORATION OF CHARRABLE ORGANIC LIQUIDS
Original Filed Nov. 16, 1951 3 Sheets-Sheet 1

INVENTOR.
Lowell W. Petersen
BY
ATTORNEY

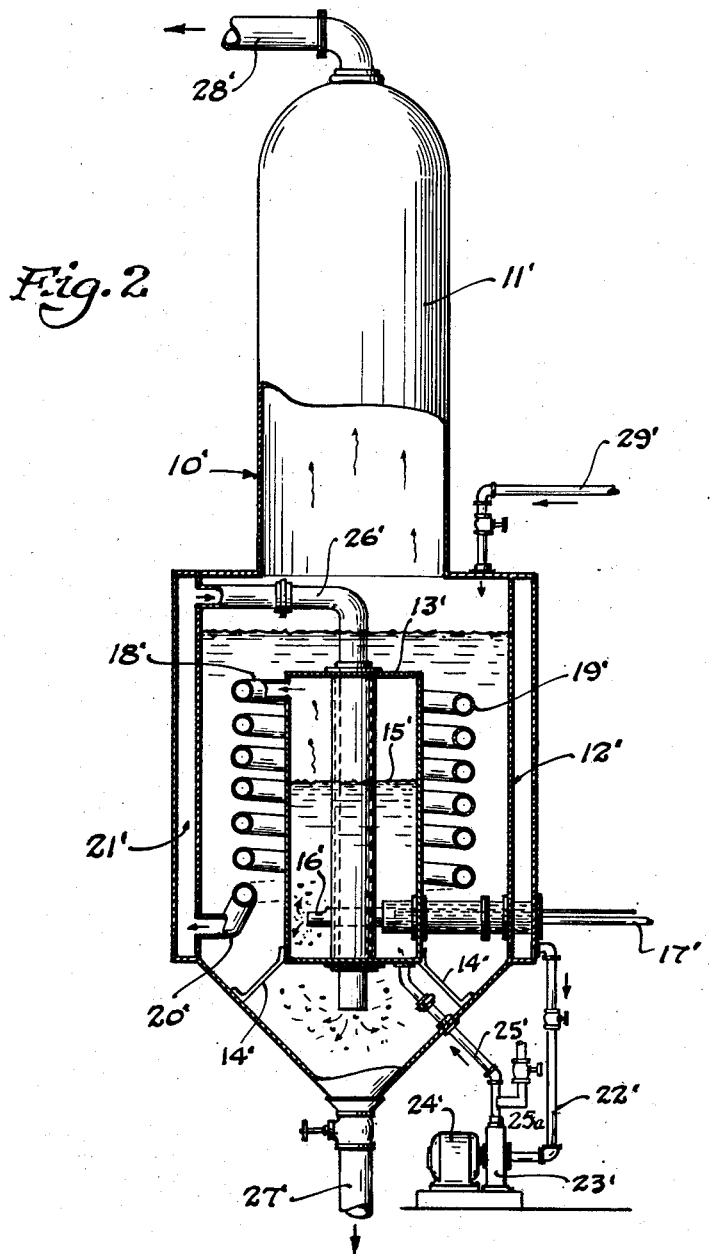

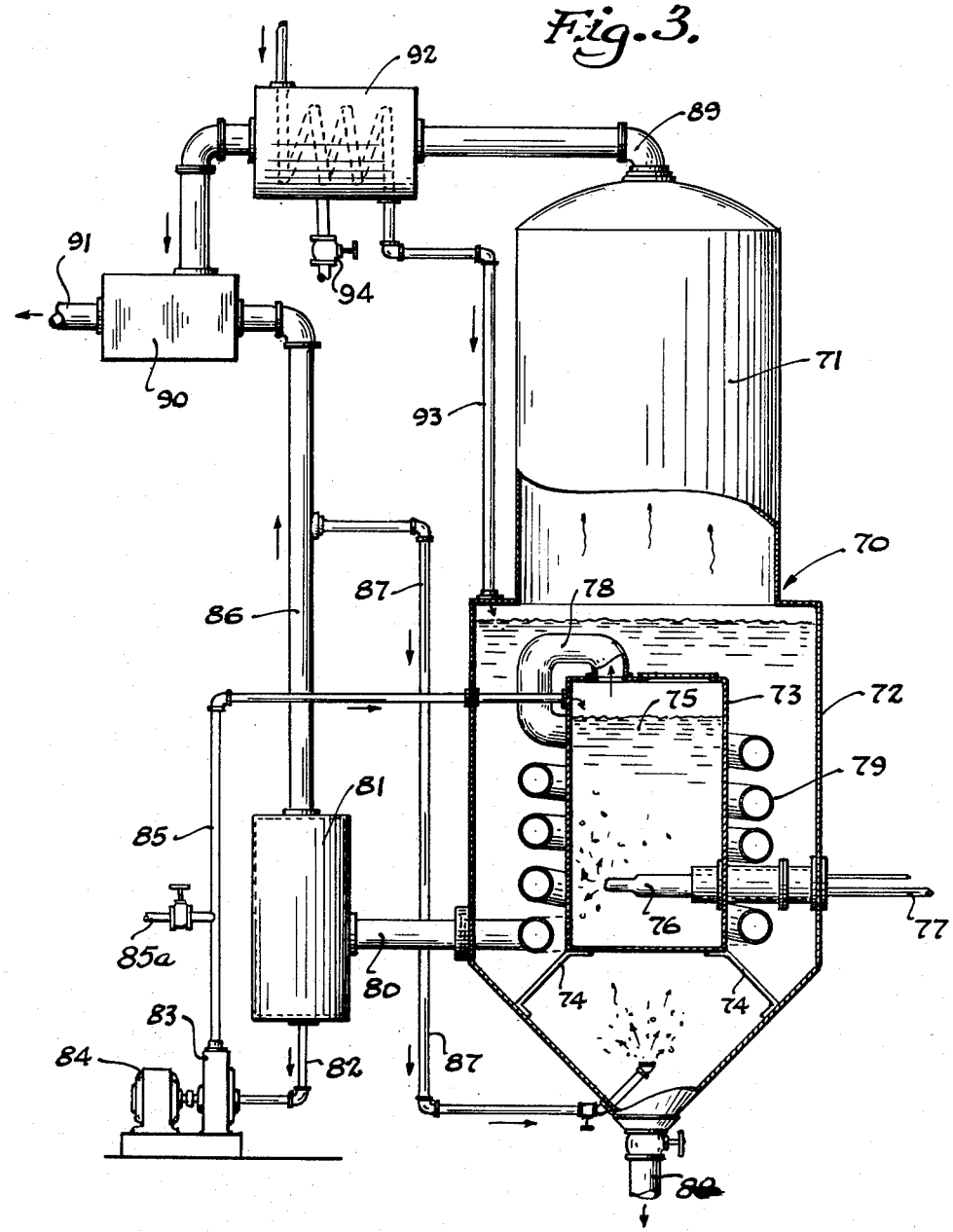

United States Patent Office 2,834,409
Patented May 13, 1958

2,834,409

EVAPORATION OF CHARRABLE ORGANIC LIQUIDS

Lowell W. Petersen, Homewood, Ill., assignor to Swift & Company, Chicago, Ill., a corporation of Illinois Original application November 16, 1951, Serial No. 256,680, now Patent No. 2,762,429, dated September 11, 1956. Divided and this application December 22, 1955, Serial No. 554,761

10 Claims. (Cl. 159—16)

This invention relates to a method and apparatus for the concentration of charrable organic liquids, and more particularly to a method of cooling hot combustion gases to a noncharring temperature through the vaporization of a condensible fluid maintained below the surface of the liquid to be concentrated, and to apparatus for carrying out the said method.

This is a divisional application of my copending application Serial No. 256,680, filed November 16, 1951, and now Patent 2,762,429, for an invention entitled Apparatus for Concentrating Heat Sensitive Liquids.

The concentration of organic liquids in the past has generally been carried out through the use of jacketed vessels of various types wherein the heating medium was separated from the liquid to be concentrated by metal walls or the like. The principal reason for this has been the difficulty encountered in the prevention of charring or burning of the organic liquids when direct contact of the heating gases with the liquid was provided. It is well known that direct gas contact with the liquid to be concentrated is a more effective means of heat transfer resulting in partial pressure evaporating conditions which produce lower boiling temperatures. In addition, the bubbling of the gases through the liquid provides agitation thereof with a further gain in efficiency of heating. This direct contact combustion gas type of concentration is widely used in the evaporation and concentration of inorganic liquids. However, the problem with respect to the concentration of organic liquids is much more difficult. Organic liquids, such as milk, whey, and the like, are extremely heat-sensitive and direct contact of hot combustion gases with such liquids has in the past resulted in considerable charring and burning of the material being concentrated. For example, when whey is being concentrated for use in animal foods, the resulting product of a direct contact combustion gas evaporation is of a blackish-brown color due to charring rather than of the desirable light brown, tan or cream color of concentrated whey made by the less efficient evaporating and concentrating methods. In contrast to these difficulties of charring and the like, the increased efficiency and lower cost of a direct contact combustion gas concentration plant made it very desirable from the standpoint of economy that some means be devised to permit the use of direct contact combustion gas concentration in the concentration of charrable organic liquids.

Therefore, it is an object of the present invention to provide a method for the concentration of organic liquids by direct contact with combustion gases without appreciable charring taking place.

It is another object of this invention to provide a method of cooling hot combustion gases prior to direct introduction thereof into a charrable organic liquid being concentrated.

An additional object of this invention is to provide apparatus for carrying out the introduction of partially cooled combustion gases into a charrable organic liquid being concentrated whereby the said liquid is not affected by charring.

It is a further object of the invention to provide a method for cooling hot combustion gases prior to direct contact thereof with a charrable organic liquid to be concentrated, utilizing the heat of vaporization of a noncharrable, condensible fluid for such cooling.

Additional objects, if not specifically set forth herein, will be readily apparent to one skilled in the art from the following detailed description of the invention:

In the drawings:

Fig. 2 represents a partially-sectioned, front elevation of a second form of apparatus capable of carrying out the present method; and Fig. 3 is a partially-sectioned, front elevation of another form of apparatus capable of carrying out the present method.

Figure 1:
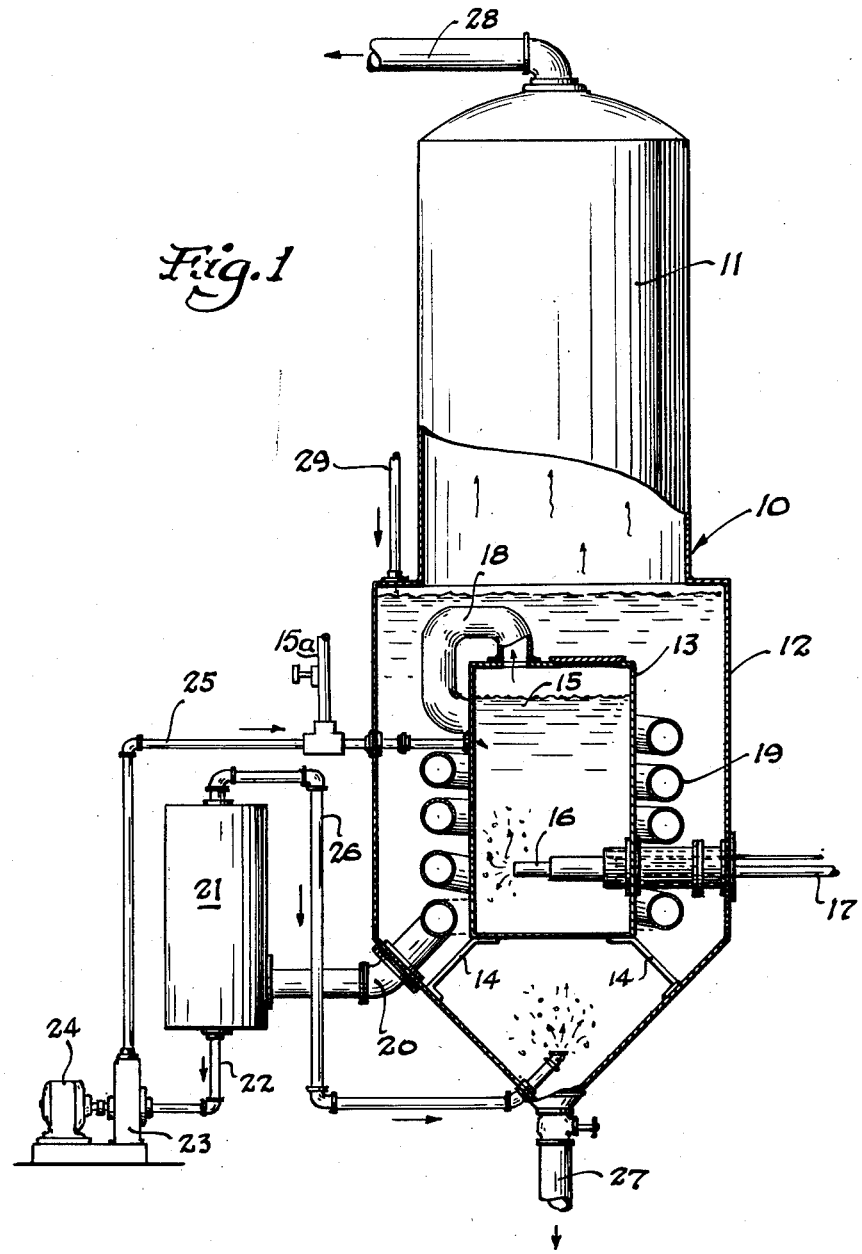
Fig. 1 represents a partially-sectioned, front elevation of one form of apparatus capable of carrying out the present method.

Generally, the present invention resides in the provision of a method and apparatus for cooling down hot combustion gases, prior to contact thereof with the liquid to be concentrated, to a sufficiently low temperature to prevent charring of the organic liquid being concentrated upon contact therewith of said gases.

More particularly, the present invention contemplates cooling hot combustion gases through the vaporization of a noncharrable, condensible fluid disposed below the liquid level of the charrable organic liquid to be concentrated, but not in direct contact therewith. According to the present invention, the hot gases may cause such vaporization either by direct or indirect heat exchange with the noncharrable, condensible fluid. However, in all cases, the vaporization of the fluid takes place prior to direct contact with the combustion gases with the charrable liquid to be concentrated, thus decreasing the temperature of the hot gases by the amount of heat required to vaporize the condensible fluid. As will be more fully described below, this heat of vaporization is not entirely lost, but is utilized in the manner hereinafter described as an auxiliary means of heating the charrable organic liquid to be concentrated.

Referring now to Fig. 1 of the drawings, 10 represents a conventional evaporator shell having a vapor head space 11 and a liquid-containing body portion 12. Mounted within the liquid-containing body portion 12 is a condensible fluid chamber or pressure tank 13, which may be of any suitable shape, but preferably takes the form of a cylinder as illustrated. Chamber 13 is supported within body 12 in any suitable fashion, as for example by braces 14. Within chamber 13 is a body of noncharrable, condensible fluid 15. This fluid may be, and will usually be, water, but any noncombustible, volatile organic or inorganic liquid is contemplated for use. Positioned within chamber 13 and below the level of the fluid 15 is a submerged combustion burner 16 of any suitable design, fed by fuel line 17. While it is preferable from the standpoint of heat economy to effect combustion within the shell of the evaporator, it is also within the scope of the invention to cause combustion to take place outside of the evaporator and to cause the hot gases to pass into chamber 13 as through line 17. In the form of apparatus shown in Fig. 1, the hot gases pass from the burner 16 directly into the condensible fluid 15 and bubble upwardly therethrough, effecting appreciable vaporization of said liquid. The mixture of partially cooled gases and vapor pass from chamber 13 through pipe 18 into coil 19 disposed annularly about chamber 13 and situated in the body of organic liquid to be concentrated. The gases, cooled substantially below their initial temperature, give up additional heat to the liquid to be concentrated by indirect heat transfer through the walls of coil 19. The mixture of gases and vapor are then passed through line 20 to a separator 21, positioned externally of the evaporator shell wherein the combustion gases are separated from the condensed vapor. The condensate is returned via line 22, pump 23 operated by motor 24, and line 25 to the fluid body in chamber 13. A valved line 15a is provided in this return line for addition of fluid should the separation prove inefficient, thus maintaining the amount of fluid available in the system at a constant level. The combustion gases, now cooled to a noncharring temperature, are passed from the separator body through line 26 to the bottom of evaporator 12 where they bubble directly through the liquid to be concentrated. The evaporator is provided with the usual drain 27, vapor stack 28, and raw feed line 29.

Referring now to Fig. 2 of the drawings, a modified version of the apparatus of Fig. 1 is illustrated. The structure of this apparatus is substantially identical to that of Fig. 1 for the most part, and corresponding identification numerals marked with a prime (') have been used throughout for convenience of reference to the discussion of the apparatus of Fig. 1. The apparatus of Fig. 2, however, makes use of an internally positioned separator 21' which comprises an annular jacket positioned about the outer periphery of the liquid-containing shell portion 12'. The vaporized fluid, after passing through coil 19', enters separator 21' wherein it is condensed and the condensate returned to chamber 13' via line 22' pump 23' operated by motor 24', and line 25'. Make-up fluid may be added through line 25a'. The combustion gases which have passed through the coil 19' in admixture with the vaporized fluid, pass out the top of the annular separator through line 26' which passes downwardly through chamber 13' to provide a means of entrance of the cooled gases into the liquid at the bottom of body portion 12'. This modification conserves more of the heat than does that of Fig. 1, and requires less insulation of external portions of the apparatus.

Referring now to Fig. 3 of the drawings, 70 represents a conventional evaporator having a vapor head space 71 and liquid-containing portion 72. Mounted within the liquid-containing portion 72 is a condensible fluid chamber or pressure tank 73, which may be of any suitable shape, but preferably takes the form of a cylinder as illustrated. Chamber 73 is supported within shell 72 in any suitable fashion, as for example by braces 74. Within chamber 73 is a body of noncharrable, condensible fluid 75. This fluid may be, and will usually be, water, but any noncharrable, condensible fluid as for example a volatile, noncombustible, low boiling point organic or inorganic liquid is contemplated for use. Positioned within chamber 73 and below the level of fluid 75 is a submerged combustion burner 76 of any suitable design, fed by fuel line 77. While it is preferred from the standpoint of heat economy to effect combustion within the body of the evaporator, it is also within the scope of the invention to cause combustion to take place outside of the evaporator body and to cause the hot gases to pass into chamber 73 as through line 77. In the form of apparatus shown in Fig. 3, the hot gases pass from the burner 76 directly into the condensible fluid 75 and bubble upwardly therethrough, effecting appreciable vaporization of said liquid. The mixture of partially-cooled gases and vapor passes from chamber 73 through pipe 78 and into coil 79 disposed annularly about chamber 73 and situated in the body of organic liquid to be concentrated. The gases, cooled substantially below their initial temperature, give up additional heat to the liquid to be concentrated by indirect heat transfer through the walls of coil 79. The mixture of gases and vapor is then passed through line 80 to a separator 81, positioned externally of the evaporator body, wherein the combustion gases are separated from the condensed vapors. The condensate is returned via line 82, pump 83 operated by motor 84, and line 85 to the fluid body in chamber 73. A line 85a is provided for addition of fluid should the gas-fluid separation prove inefficient, thus maintaining the amount of fluid available in the system at a constant level. The combustion gases, now cooled to a noncharring temperature, are passed from the separator 81 through line 86 into and through a conventional vacuum-inducing means 90 which pulls a partial vacuum on vapor space 71 through line 89 and condenser 92. The bulk of the combustion gases are thus passed through the vacuum-inducing means 90 and via line 91 out of the system. A portion of the cooled gases may be passed through line 87, connected to and supplied from line 86, and into the bottom of the evaporator body portion 72 where they bubble directly through the liquid to be concentrated. The evaporator is provided with the usual drain 88 and raw feed line 93. Any condensate collecting in condenser 92 may be drawn off through valve 94.

The temperature of the hot combustion gases leaving the combustion chamber will vary to a considerable extent depending on the fuel used. A typical gaseous fuel, such as a natural gas composed of approximately 82.8 percent $CH_4$, 16.3 percent $C_2H_6$, 0.8 percent illuminants, when mixed with 9 to 10 volumes of air will produce a temperature of about 1800° to 2800° F. in the combustion chamber, depending upon the air-gas ratio used. Using the present method, this temperature can be reduced to approximately 212° F. by the time the gases come into direct contact with the liquid to be concentrated.

As can be seen from the foregoing description, the method of this invention successfully overcomes the disadvantages of the use of direct contact combustion gas concentration of charrable organic liquids, thereby opening up a new and more efficient field of concentrating such liquids to the industry. This invention is of particular value to dairy, sugar, and other industries employed in concentrating solutions of organic origin. It is obvious that the invention could be used in the concentration of inorganic solutions, but its use would not be so advantageous in such fields since the problem of charring is usually not present in the concentration of most inorganic solutions.

The apparatus disclosed herein may be installed in the conventional evaporator shell, and hence a change-over to direct contact combustion gas concentration would not necessitate a great outlay for new equipment. Further, the apparatus of this invention takes up considerably less space than the conventional double and triple effect evaporators in common use today, and consequently will permit greater production from the same plant area than is now possible.

Obviously, many modifications and variations of the invention as hereinbefore set forth may be made without departing from the spirit and scope thereof, and therefore only such limitations should be imposed as are indicated in the appended claims.

I claim:

1. A method for concentrating charrable, organic liquids which comprises: passing a stream of hot combustion gases into an enclosed body of a noncharrable, condensible liquid; said body of liquid being out of direct contact with said charrable, organic liquid; directly contacting said noncharrable, condensible liquid and said hot combustion gases to vaporize said noncharrable, condensible liquid and thus partially cool said hot gases to a noncharring temperature; passing the mixture of vapors of the noncharrable, condensible liquid and cooled gases in indirect heat exchange with said charrable liquid; separating the condensed vapors of said noncharrable, condensible liquid resulting from said indirect heat exchange from the cooled combustion gases and remaining vapors; and thereafter passing the partially cooled gases and remaining vapors into the body of said charrable liquid.

2. A method for concentrating charrable, organic liquids which comprises: passing a stream of hot combustion gases into an evaporating zone containing a body of charrable, organic liquid, said hot combustion gases first being passed into a body of noncharrable, condensible fluid within said zone and below the level of said charrable liquid but out of contact therewith whereby said noncharrable fluid is vaporized and the hot gases partially cooled; effecting indirect heat exchange between the mixture of the vapors of said noncharrable condensible fluid and cooled combustion gases and said charrable liquid; separating the condensed, noncharrable liquid resulting from said indirect heat exchange from the mixture of cooled gases and uncondensed vapors; and thereafter passing said partially cooled gases and uncondensed vapors into direct contact with said charrable organic liquid near the bottom of the body of charrable liquid.

3. A method for concentrating charrable, organic liquids which comprises: passing a stream of hot combustion gases into a zone containing a body of noncharrable, condensible liquid; effecting direct heat exchange between said hot gases and said noncharrable, condensible fluid while keeping said gases and noncharrable, condensible liquid out of direct contact with said body of organic liquid whereby said hot gases are cooled to a noncharring temperature through vaporization of said noncharrable fluid; effecting indirect heat transfer between the mixture of vapors and cooled gases and said charrable liquid; and thereafter contacting said charrable organic liquid with the partially cooled combustion gases whereby charring of said liquid is avoided.

4. In a method for concentrating charrable, organic liquids by direct contact combustion gas heating, the steps which comprise: vaporizing a body of noncharrable, condensible fluid in a zone below the surface of and out of direct contact with the charrable, organic liquid to be concentrated, by direct contact heat transfer with the combustion gases, whereby said gases are partially cooled; passing the vaporized fluid and gases in indirect heat exchange relationship with the charrable, organic liquid to extract heat from said vapors and to condense the same; returning the condensate thus formed to said body of noncharrable, condensible fluid; and passing the uncondensed vapors and combustion gases partially cooled by said heat transfer directly into the organic liquid to be concentrated.

5. In a method for concentrating charrable organic liquids by direct contact combustion gas heating, the steps which comprise: passing a stream of hot combustion gas in direct heat exchange relationship with a body of noncharrable, condensible fluid maintained below the surface of and out of direct contact with the charrable, organic liquid to be concentrated; vaporizing at least a portion of said noncharrable fluid by heat obtained from said gases, thereby effecting a partial cooling of said gases; transferring the heat from the vapors thus formed by indirect heat transfer to the organic liquid to be concentrated; and directly contacting said organic liquid with the partially cooled combustion gases.

6. In a method for concentrating charrable organic liquids by direct contact combustion gas heating, the steps which comprise: passing a stream of hot combustion gases in direct heat exchange relationship into a body of noncharrable, condensible fluid maintained below the surface of and out of direct contact with the charrable, organic liquid to be concentrated; vaporizing at least a portion of said noncharrable fluid by heat obtained from said gases, thereby effecting a partial cooling of said gases; transferring the heat from the vapors thus formed to condense the same by indirect heat transfer with the organic liquid to be concentrated; separating the uncondensed products from the condensed, noncharrable fluid; and directly contacting said organic liquid with at least a portion of said uncondensed products.

7. Apparatus for concentrating heat charrable liquids comprising: an evaporator shell having a vapor head space and a body portion adapted to contain a charrable liquid to be concentrated; a chamber within said body portion containing a condensible, noncharrable liquid; conduit means containing an orifice within said chamber for supplying hot combustion gases to said chamber; indirect heat exchange means exterior of said chamber and within said body portion, one end of said heat exchange means connected to and opening into said chamber at the upper end thereof; an annular chamber substantially surrounding said body portion; the other end of said indirect heat exchange means being connected to an opening into said annular chamber; second conduit means connected to an opening into said annular chamber; the opposite end of said second conduit means opening into said body portion below said indirect heat exchange means; and means for returning condensed fluid from said annular chamber to said chamber within said body portion.

8. Apparatus for concentrating charrable organic liquids comprising: an evaporator shell having a vapor head space and a body portion adapted to contain a charrable liquid to be concentrated; a chamber mounted within said body portion and adapted to contain a non-charrable condensable fluid; means for supplying hot combustion gases directly into said chamber below the level of said non-charrable condensible fluid; heat exchange means disposed within said body portion external of said chamber for cooling the combustion gases by indirect heat exchange with said charrable liquid; means so connecting said heat exchanger to said chamber as to provide a continuous passage leading from and returning to said chamber whereby to provide a passage for said noncharrable, condensible fluid to be removed from said chamber and re-enter said chamber after passage through said heat exchange means; means connecting said heat exchange means with said body portion for passage of at least a portion of the cooled combustion gases into said body portion; means connected to said heat exchange means for separating condensed vapors from uncondensed gases and vapors; and vacuum-inducing means connected to said vapor head space and to said separating means so as to cause a partial vacuum to be pulled on said evaporator body by the passage therethrough of the remainder of said combustion gases.

9. Apparatus for concentrating charrable, organic liquids comprising: an evaporator shell having a vapor head space and a body portion adapted to contain a charrable liquid to be concentrated; a chamber mounted within said body portion containing a noncharrable, condensible fluid; means for supplying hot combustion gases directly into said chamber below the level of said noncharrable liquid; heat exchange means disposed within said body portion external of said chamber and connected to said chamber for passing said combustion gases and vapors of said noncharrable liquid in indirect heat exchange with said liquid to be concentrated in said body portion of the evaporator whereby the combustion gases are cooled; and means for discharging the cooled combustion gases into direct contact with said liquid to be concentrated in said body portion.

10. Apparatus for concentrating charrable organic liquids comprising: an evaporator shell having a vapor head space and a body portion adapted to contain a charrable liquid to be concentrated; a chamber mounted in said body portion containing a condensible, noncharrable liquid; means for supplying hot combustion gases into said chamber to contact directly said noncharrable liquid below the surface thereof; a heat exchange coil disposed within said body portion exterior of said chamber; means connecting said coil with the upper portion of said chamber to conduct vapors and gases through said coil whereby the combustion gases are cooled by indirect heat exchange with the charrable liquid in said body portion; a separator; means for conducting said vapors and combustion gases from said coil through said separator to separate condensate from the cooled combustion gases; means connecting said separator with said body portion for discharging the cooled combustion gases into direct contact with the charrable liquid in said body portion; and means connecting said separator with said chamber for returning condensate to the noncharrable liquid in said chamber.

No references cited.